United States Patent
Kitani

(10) Patent No.: US 7,777,793 B2
(45) Date of Patent: Aug. 17, 2010

(54) SIGNAL PROCESSOR HAVING A/D CONVERSION UNIT AND OPERATION PART

(75) Inventor: Kazunari Kitani, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 390 days.

(21) Appl. No.: 11/614,482

(22) Filed: Dec. 21, 2006

(65) Prior Publication Data

US 2007/0146496 A1    Jun. 28, 2007

(30) Foreign Application Priority Data

Dec. 26, 2005    (JP)    ............... 2005-373090

(51) Int. Cl.
*H04N 5/217*    (2006.01)
*H04N 9/64*    (2006.01)
*H04N 5/00*    (2006.01)

(52) U.S. Cl. ............... 348/251; 348/241; 348/243; 348/245; 348/607; 348/615

(58) Field of Classification Search ......... 348/241–251, 348/222.1, 607, 615
See application file for complete search history.

(56) References Cited

U.S. PATENT DOCUMENTS

| | | | | |
|---|---|---|---|---|
| 4,701,784 A | * | 10/1987 | Matsuoka et al. | ........... 348/247 |
| 5,278,658 A | * | 1/1994 | Takase | ........... 348/243 |
| 5,943,094 A | * | 8/1999 | Sakai et al. | ........... 348/243 |
| 6,157,407 A | * | 12/2000 | Kobayashi | ........... 348/241 |
| 6,304,292 B1 | * | 10/2001 | Ide et al. | ........... 348/243 |
| 6,525,769 B1 | * | 2/2003 | Thomas et al. | ........... 348/243 |
| 7,161,626 B1 | * | 1/2007 | Nara | ........... 348/243 |
| 7,463,294 B2 | * | 12/2008 | Tsuda | ........... 348/251 |
| 7,551,212 B2 | * | 6/2009 | Ise | ........... 348/243 |
| 7,623,164 B2 | * | 11/2009 | Takeda | ........... 348/257 |
| 2001/0005226 A1 | * | 6/2001 | Muramatsu et al. | ........... 348/304 |
| 2004/0090547 A1 | * | 5/2004 | Takeda | ........... 348/241 |
| 2004/0095487 A1 | * | 5/2004 | Sato | ........... 348/243 |
| 2004/0189839 A1 | * | 9/2004 | McDermott | ........... 348/243 |
| 2006/0202036 A1 | * | 9/2006 | Wang et al. | ........... 235/462.07 |
| 2007/0146496 A1 | | 6/2007 | Kitani | ........... 348/222.1 |

FOREIGN PATENT DOCUMENTS

JP    6-085668    3/1994

* cited by examiner

*Primary Examiner*—David L Ometz
*Assistant Examiner*—Richard M Bemben
(74) *Attorney, Agent, or Firm*—Fitzpatrick, Cella, Harper & Scinto

(57) ABSTRACT

A signal processor formed on a single semiconductor chip having an A/D conversion unit for converting an analog signal to a digital signal, includes an operation unit for performing a calculation based on a plurality of digital signals converted by the A/D conversion unit, and a selection unit for selecting one of the digital signals converted by the A/D conversion unit and a result calculated by the operation unit and externally outputting the selection.

7 Claims, 10 Drawing Sheets

AT THE TIME OF INTEGRAL OUTPUT

| Ch1 | Ch2 | Ch1 | Ch2 | Ch1 | Ch2 | Ch1 | Ch2 |
|---|---|---|---|---|---|---|---|
| R | G | R | G | R | G | R | G |
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |

| Ch1 | Ch2 | Ch1 | Ch2 |
|---|---|---|---|
| RU | GU | RL | GL |
| GU | BU | GL | BL |
| RU | GU | RL | GL |
| GU | BU | GL | BL |
| RU | GU | RL | GL |
| GU | BU | GL | BL |

SIGNAL PROCESSOR HAVING A/D CONVERSION UNIT AND OPERATION PART

BACKGROUND OF THE INVENTION

1. Field of the Invention

The present invention relates to a signal processor having an A/D conversion unit and an operation part, and an image capture apparatus using the same.

2. Description of the Related Art

In a digital camera, a video camera or the like, a CCD or CMOS image sensor is typically used as an image pickup element.

In an image capture apparatus using the image pickup element as described above, a large amount of complex computation is required to calculate an average value of an output within a predetermined area of a captured image or to calculate a projection image in a horizontal or vertical direction of a captured image.

Examples of such a computation include dark correction and dark shading correction. For example, in the dark correction, an average value of an optical black portion (herein referred to as an OB portion) that is a black reference for an image pickup element is calculated, and the average value is subtracted from an effective image output. The dark shading correction is a correction in which a dark image is photographed with an image pickup element shielded from light, a mapping operation is performed on the image in the horizontal direction and in the vertical direction, an average value for each column in the vertical direction and each row in the horizontal direction is calculated, and the average values are subtracted from effective image output.

Conventionally, to implement such a function, dedicated hardware is provided, or firmware of a control CPU repeats time-consuming operations.

Particularly, in an image capture apparatus using a CMOS image sensor having a plurality of readout channels, an average value for each channel is calculated. Additionally, a mapping operation for each channel leads to a very large burden on the system, since it is achieved only by operations using large hardware which can process a plurality of channels individually or firmware which requires processing time for repeating a process for each channel.

An A/D converter circuit is described in Japanese Patent Application Laid-Open No. H06-085668. The A/D converter circuit includes a memory circuit which temporarily stores a plurality of A/D converted values, and an arithmetic circuit into which the plurality of A/D converted values read out from the memory circuit are inputted and which performs predetermined arithmetic processing on the values and outputs the processed values as A/D converted values corresponding to an analog input voltage.

However, in the case of an image capture apparatus using a CMOS image sensor having a plurality of readout channels, the number of readout channels of the CMOS image sensor depends on a product. Therefore, a product which requires high-speed readout needs to be provided with much more readout channels. On the contrary, a product which requires only low-speed readout needs to have just a single readout channel. The difference between them results in a big difference also in cost. On the other hand, when a processing circuit supporting a plurality of channels is implemented in an image processing IC which processes them, the processing circuit naturally needs to support a maximum number of the channels, and providing such an image processing IC to a product having a single readout channel has a significant cost disadvantage. Of course, it is also not realistic to provide an image processing IC for a different hardware configuration for each product.

When such a processing is fully performed by firmware, a series of processes, in which only data whose memory address corresponds to each channel is sequentially accessed in a memory into which image data has been loaded and then addition and storage are performed, is repeated, and therefore the memory access time has a considerable influence on the processing time of the system. In addition, there is a problem that a great amount of time is required when a processing area is large.

Particularly, in a product having a CMOS image sensor with a plurality of readout channels, it is required that only a specific channel data is extracted from a memory into which image data has been loaded and arithmetic processing is performed on the extracted data. For this reason, memory access time is required. Therefore, particularly in a product having a CMOS image sensor with a plurality of readout channels which needs high-speed processing, there is a significant problem in reducing its processing time.

SUMMARY OF THE INVENTION

As an aspect of the present invention, there is provided a signal processor formed on a single semiconductor chip having an A/D conversion unit for converting an analog signal to a digital signal, comprising an operation unit for performing a calculation based on a plurality of digital signals converted by the A/D conversion unit, and a selection unit for selecting a digital signal converted by the A/D conversion unit and a result calculated by the operation unit and externally outputting the selected one.

In addition, in accordance with another aspect of the present invention, there is provided an image capture apparatus, comprising an image pickup element for generating an analog signal, an A/D conversion unit for converting the analog signal generated by the image pickup element to a digital signal, an operation unit for performing a calculation based on a plurality of digital signals converted by the A/D conversion unit, a selection unit for selecting and outputting a digital signal converted by the A/D conversion unit and a result calculated by the operation unit, and an image processing unit for correcting the digital signal outputted from the A/D conversion unit not through the operation unit based on a digital signal outputted from the operation unit, wherein the A/D conversion unit, the operation unit and the selector unit are formed on a first semiconductor chip, and the image processing unit is formed on a second semiconductor chip that is different from the first semiconductor chip.

Further features of the present invention will become apparent from the following description of exemplary embodiments with reference to the attached drawings.

DESCRIPTION OF THE EMBODIMENTS

First Exemplary Embodiment

A camera operation of an image capture apparatus according to the first exemplary embodiment of the present invention will be briefly described with reference to FIGS. 1 and 2. In the embodiment, vertical dark shading correction is performed with a single readout channel.

Figure 1:
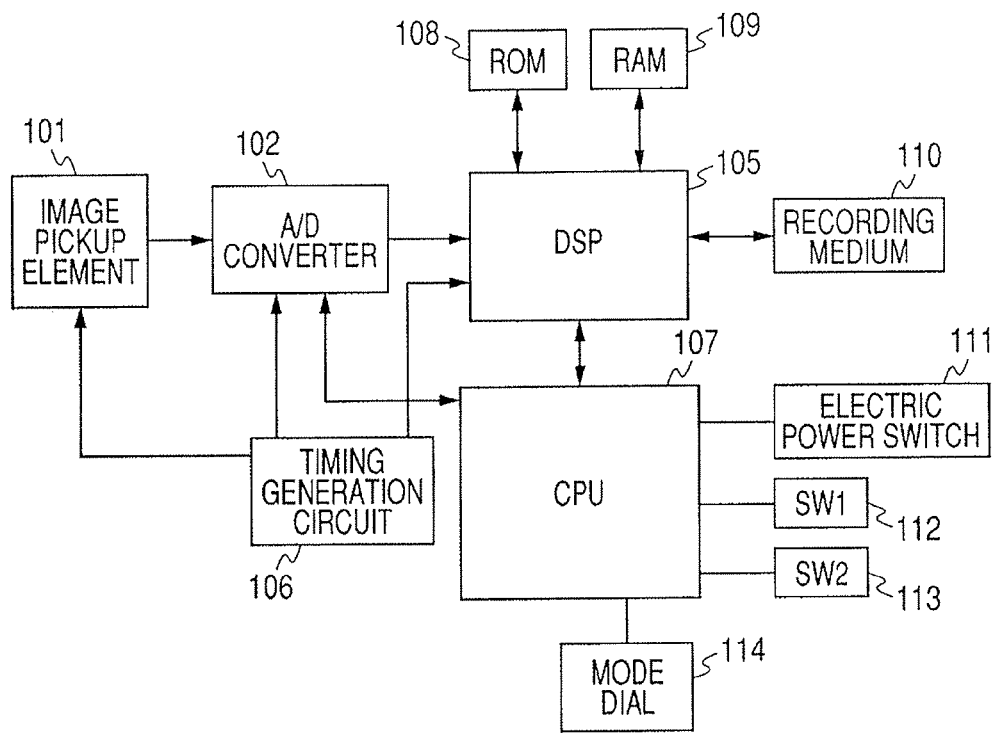
FIG. 1 is a diagram which shows a configuration example of a digital camera or a digital video camera according to a first exemplary embodiment of the present invention.

FIG. 1 shows a diagram which shows a configuration example of a digital camera or a digital video camera according to the first exemplary embodiment of the present invention. Reference numeral 101 denotes an image pickup element using a CCD or CMOS sensor which generates an analog signal by photoelectric conversion. In the embodiment, a CMOS image sensor having a single analog output is assumed to be used. Reference numeral 102 denotes an analog-digital converter (A/D converter) which converts an analog signal from the image pickup element 101 to a digital signal and is formed on a single semiconductor substrate.

Reference numeral 105 denotes a DSP (Digital Signal Processor) for image processing. The DSP 105 is formed on a semiconductor substrate that is different from the substrate on which the analog-digital converter 102 is formed, and performs various image processings, such as a correction processing and a development processing, on data from the A/D converter 102 using a RAM 109 according to data stored in a ROM 108. In addition, the DSP 105 performs control of various memories, such as the ROM 108 and the RAM 109, and write processing of image data into the recording medium 110. The DSP (Digital Signal Processor) for image processing 105 is formed on a single semiconductor substrate.

Reference numeral 106 denotes a timing generation circuit which supplies a clock signal and a control signal to the image pickup element 101, the A/D converter 102 and the DSP 105, and is controlled by the CPU 107.

Reference numeral 107 is a CPU which controls the timing generation circuit 106 and controls camera functions, such as photometry and distance measurement that use relevant parts (not shown). The CPU 107 is connected to switches 111 to 113, a mode dial 114 and the like, and performs processes corresponding to the respective status of these elements. In addition, the CPU 107 performs the setting of an operation or the like of the A/D converter 102 through a serial communication port.

Reference numeral 108 denotes the ROM which stores various control programs and various correction data for image processing, and reference numeral 109 denotes the RAM which temporarily stores image data and correction data to be processed by the DSP 105. The RAM 109 can be accessed at a higher speed than the ROM 108.

Reference numeral 110 denotes a recording medium, such as a COMPACT FLASH® card for storing captured images, which is connected to the camera through a connector (not shown).

Reference numeral 111 denotes an electric power switch for activating the camera, and reference numeral 112 denotes a shutter switch SW1 which instructs the start of an operation, such as a photometry processing or a distance measurement processing. Reference numeral 113 denotes a shutter switch SW2 which instructs the start of a series of operations for image capture in which a mirror and a shutter (not shown) are driven, and a signal read out from the image pickup element 101 is written into the recording medium 110 through the A/D converter 102 and the DSP 105.

The A/D converter 102 will now be described in detail. An A/D converter shown in FIG. 2 is the A/D converter 102 in FIG. 1, and the inside of the A/D converter is composed of the following blocks.

The A/D converter comprises an A/D conversion unit (ADC) 150 which is a core of the A/D converter converting an analog signal to a digital signal and the serial controller 151, which performs serial communication with the CPU 107. The A/D converter further comprises a register into which the CPU 107 writes data by the serial controller 151 and a controller 152 which controls the overall operation of the A/D converter, and an integral circuit 153 which integrates data of a predetermined timing according to an instruction from the controller 152. The A/D converter further comprises an averaging circuit 154 which calculates an average value according to an integral result of the integral circuit 153 and a setting from the controller 152. The A/D converter further comprises an output selection circuit 155 which switches and outputs a digital output of the ADC 150, an output of the integral circuit 153 or an output of the averaging circuit 154 at a predetermined timing according to an instruction from the controller 152. The A/D converter (ADC) 150, the serial controller 151, the controller 152, the integral circuit 153, the averaging circuit 154 and the output selection circuit 155 are formed on a single semiconductor substrate.

The integral circuit 153 and the averaging circuit 154 are operation means for calculation based on a plurality of digital signals converted by the ADC 150. The integral circuit 153 calculates an integral value of the plurality of digital signals. The integral circuit 153 and the averaging circuit 154 calculate an average value of the plurality of digital signals. The output selector circuit 155 selects and outputs an output of the ADC 150, an output of the integral circuit 153 or an output of the averaging circuit 154 based on an external signal.

Operations in the camera system illustrated in FIG. 1 will next be described. Various type of image pickup elements may have a so-called dark shading, which is a gradual change of a dark level in the vertical direction of a captured image due to a process of the elements or the like.

When there is such a vertical dark shading, it is desirably corrected by some means because it may cause significantly degraded image quality such as, among others, a noise or unevenness in a low luminance portion over a screen or destroy the color balance of an image.

In the embodiment, a method for calculating correction data for a vertical dark shading of a captured image contained in a dark image and correcting the dark shading is described.

Figure 3:
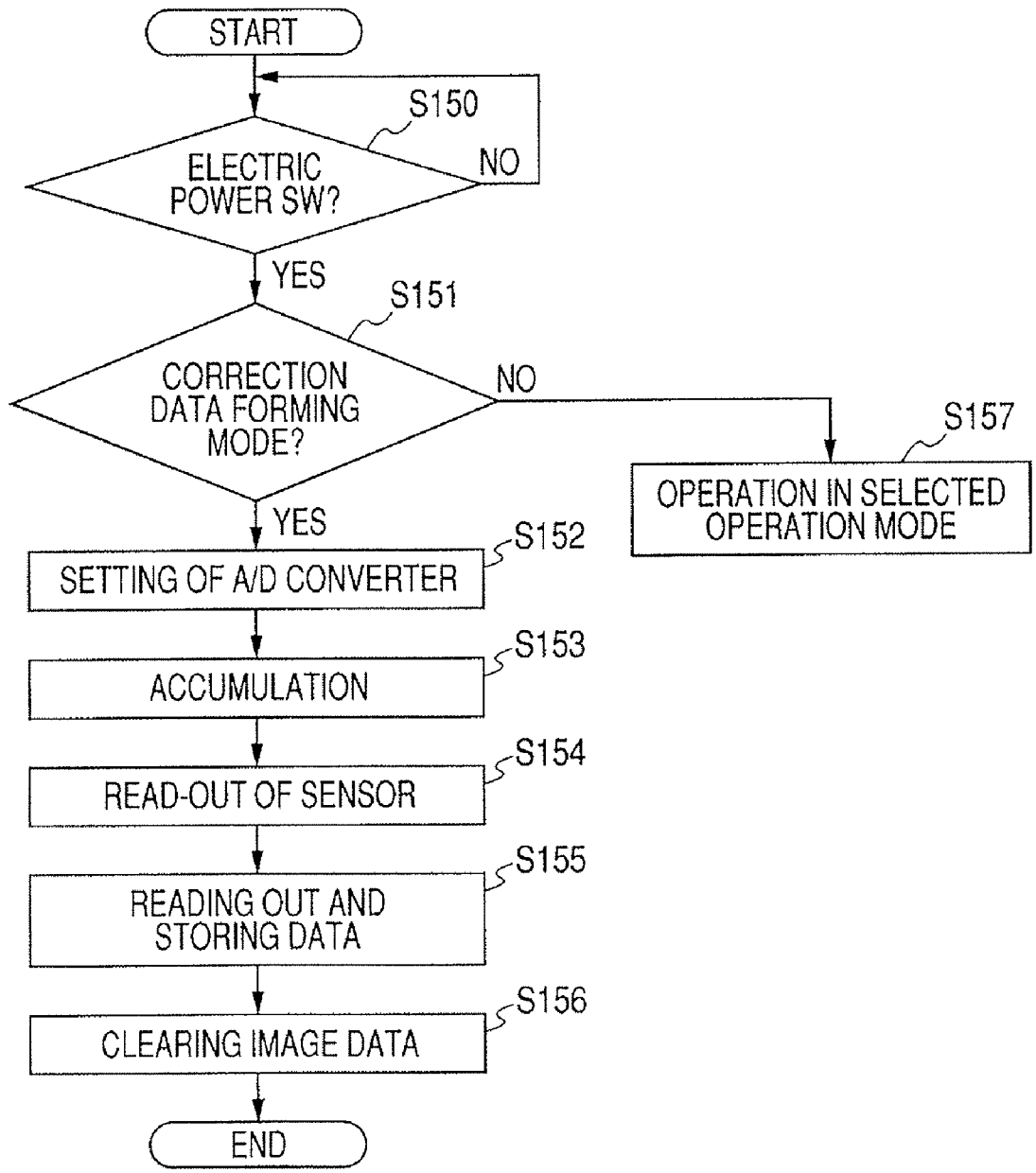
FIG. 3 is a flowchart which shows control of a camera according to the first exemplary embodiment.

FIG. 3 illustrates operations in a case where the camera is in a dark shading correction amount calculation mode.

In this photographing mode, a dark image is photographed in a predetermined accumulation time without operating a mirror and a shutter, a vertical dark shading amount contained in the dark image is calculated, and the difference between the calculated amount and a target dark level is obtained as a correction amount. At the time of a main photographing operation performed later, correction is performed using data calculated in this calculation mode.

FIG. 3 is a flowchart which shows control of the camera shown in the FIG. 1. At first, in step S150, whether the electric power switch 111 is on or not is determined, and, if it is off, step S150 is repeated. If the electric power switch 111 is on, operations following step S151 are performed.

Then, in step S151, whether or not the operation mode of the camera is in the dark shading correction amount calculation mode is determined. If in this mode, the process immediately proceeds to step S152, and, if it is not set, an operation corresponding to an operation mode set after step S157 is performed.

From step S152, a dark image is photographed. In this case, the dark image is read out without operating mechanical members, such as a mirror and a shutter.

Figure 4:
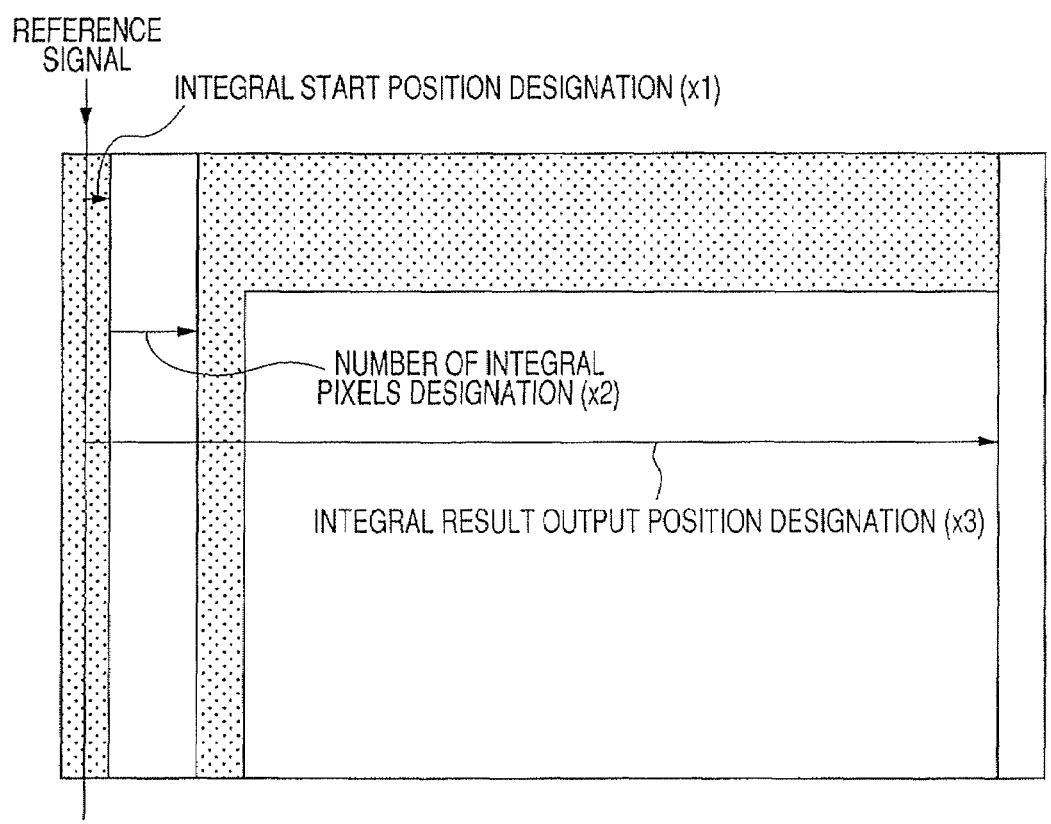
FIG. 4 is a diagram which shows processing for calculating an average value of a horizontal OB portion.

In step S152, the CPU 107 communicates with the A/D converter 102. Then, (1) an average value calculation mode is set, and (2) an integral start position (x1), (3) the number of integral pixels (x2) and (4) an average data output position (x3) are set in positions shown in FIG. 4, and a horizontal optical black (OB) area in the left side of the image pickup element is integrated and an average value thereof is calculated. And, on the right side of the image, the average value is set to replace a normal output and to be outputted. The horizontal OB area is a pixel area optically shielded from light on the left side of the image pickup element 101.

The output selection circuit 155 selects and outputs a result calculated by the averaging circuit 154 (or the integral circuit 153) outside an effective pixel output area of the image pickup element 101.

A reference signal, which is a reference for setting each position, is supplied from the timing generation circuit 106 to the A/D converter 102. Each setting value is set as the number of operation clock signals which are supplied to the A/D converter 102 from the reference clock until a desired operation is started. The A/D converter 102 counts the number of operation clock signals from a timing of the reference signal, and, when the number reaches the setting value, an operation such as inputting to the integral circuit 153, an operation of the averaging circuit 154 or switching of the output selection circuit 155 is performed.

A reference signal is typically outputted during a so-called horizontal blanking period for each row. Additionally, the operation for each row is configured to be reset in response to detection of an input of the reference signal and to repeat the same arithmetic processing for each row. Of course, additional basic settings for the A/D converter 102 are also set. In these settings, accumulation of the CMOS image sensor 101 is started in the step S153. A dark image will be made since the shutter is not open at this time point. A short accumulation time within which a dark current has no effect is enough accumulation time here. After a predetermined accumulation time, a readout operation of the CMOS image sensor 101 is started in step S154.

Because the CMOS image sensor 101 outputs an analog output in response to a signal from the timing generation circuit 106, the A/D converter 102 also performs an A/D conversion operation at this timing and sends a result of the operation to the DSP 105. In this operation mode, the DSP 105 performs no correction processing particularly, and develops image data in the RAM 109.

During this readout operation, the A/D converter 102 operates as follows. That is to say, after an operation clock of an integral start position x1 is counted from a reference signal, an integral operation is started. An A/D conversion result is integrated by the internal integral circuit 153 while the result is outputted to the DSP 105. This operation is repeated for the number of clock signals that is the set number of integral pixels x2.

When the average value calculation mode is selected, the averaging circuit 154 calculates a result obtained by dividing an integral result of the internal integral circuit 153 by the number of integral pixels. When an operation clock of the average data output position x3 from the reference signal is counted, the output selection circuit 155 replaces a normal A/D conversion result with the calculated result and outputs the calculated result.

Therefore, the average value data is not read out through a communication between the CPU 107 and the A/D converter 102, but is passed through the DSP 105 as an image data format and written out into the RAM 109.

Thus, the image data readout operation in the present operation mode is completed.

Then, in step S155, a readout and storage operation of dark shading correction data is performed.

In this step, data having an address in which the average value data calculated by the A/D converter 102 is written is read out from the image data previously read out and deployed in the RAM 109 and stored.

Since a position in which average value data in image data is written can be easily calculated from a value set in the timing signal generation circuit 106, average value data of each row in vertical direction can be sequentially read out by sequentially reading out a corresponding address on the RAM 109. Average value data thus obtained is sequentially written into a different space of the RAM 109, and thereby only average value data for each row is arranged in a different area from the image data.

Of course, at this time, not only average value data is written, but also the difference between an average value of each column and a target dark level may be obtained and written.

In addition, if the ROM 108 is writable, this data may be written into not only the RAM 109 but also the ROM 108.

At the end, the previously readout image data is cleared in step S156, and the present sequence ends.

When a following normal photographing mode is selected and a photographing operation is performed, the DSP 105 performs a predetermined correction processing operation, a development processing operation and the like while reading out correction data stored in the RAM 109 for each column and subtracting correction data from readout image data for each column at the time of readout of a captured image. By doing this, an image whose vertical dark shading is corrected can be obtained.

A reference signal supplied from the timing generation circuit 106 may be supplied as a dedicated signal, and, if there is a further control signal that is supplied for each one horizontal scan, such a signal may be a reference signal for operation. For example, in an A/D converter which performs a horizontal OB clamp therein, because a reference signal which indicates a start position of a clamp operation is supplied for each horizontal scan, the timing of the operation can be set using such a signal as a reference signal.

Figure 5:
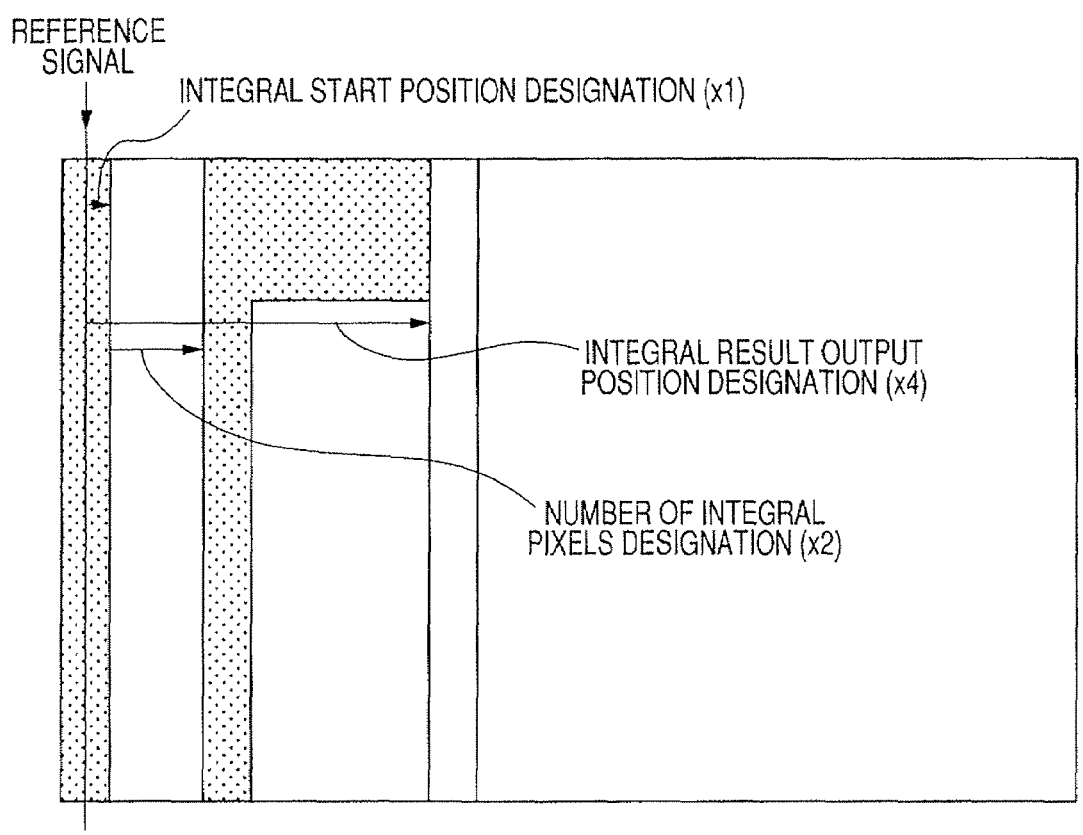
FIG. 5 is a diagram which shows a processing for calculating an average value of a horizontal OB portion (a reduction of a readout area).

In addition, when there is a limitation to a dark image as described above, an entire screen is not needed to be read out, and a readout time can be reduced by reading out only a left area of the screen as shown in FIG. 5.

In this case, as a matter of course, an average data output position set in the A/D converter 102 should be set as a corresponding position (x4).

Second Exemplary Embodiment

A camera operation of an image capture apparatus according to the second exemplary embodiment of the present invention will be briefly described with reference to FIG. 6. In the embodiment, a vertical OB portion clamp is performed in a plurality of readout channels.

Figure 6:
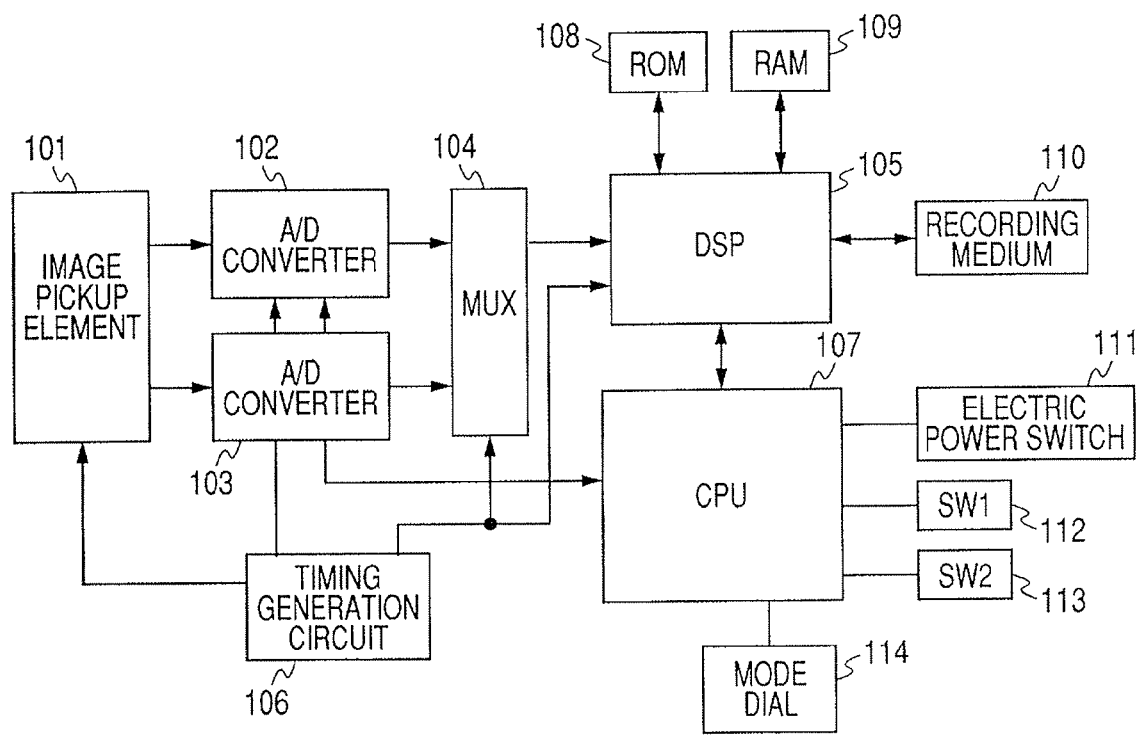
FIG. 6 is a diagram which shows a configuration example of a digital camera or a digital video camera according to a second exemplary embodiment of the present invention.

FIG. 6 is a diagram which shows a configuration example of a digital camera or a digital video camera. In FIG. 6, the same members as in FIG. 1 have the same reference numerals. In FIG. 6, reference numeral 101 denotes the image pickup element using a CCD or CMOS sensor. In the embodiment, it is assumed that the image pickup element 101 has an analog output terminal of at least two channels Ch1 and Ch2 and is a CMOS image sensor which outputs two horizontally consecutive pixels at the same time. Reference numerals 102 and 103 denote A/D converters which convert analog signals of channels Ch1 and Ch2 from the image pickup element 101 to digital signals respectively, and are formed on separate semiconductor substrates respectively.

Reference numeral 104 denotes a multiplexer (hereinafter referred to as an MUX) for multiplexing digital data from the two A/D converters 102 and 103. Reference numeral 105 denotes a DSP (Digital Signal Processor) which is formed on a semiconductor substrate that is different from the substrates on which the analog-digital converters 102 and 103 are formed. The DSP 105 performs various image processing operations, such as a correction processing and a development processing, on data from the multiplexer 104 using the RAM 109 according to data stored in the ROM 108. In addition, the DSP 105 performs control of various memories such as the ROM 108 and the RAM 109 and write processing of image data into the recording medium 110. The DSP 105 is formed on a single semiconductor substrate.

Reference numeral 106 denotes a timing generation circuit which supplies a clock signal and a control signal to the image pickup element 101, the A/D converters 102, 103, the multiplexer 104 and the DSP 105, and is controlled by the CPU 107. In addition, the CPU 107 performs setting of an operation or the like of the A/D converters 102 and 103 through a serial communication port.

Figure 2:
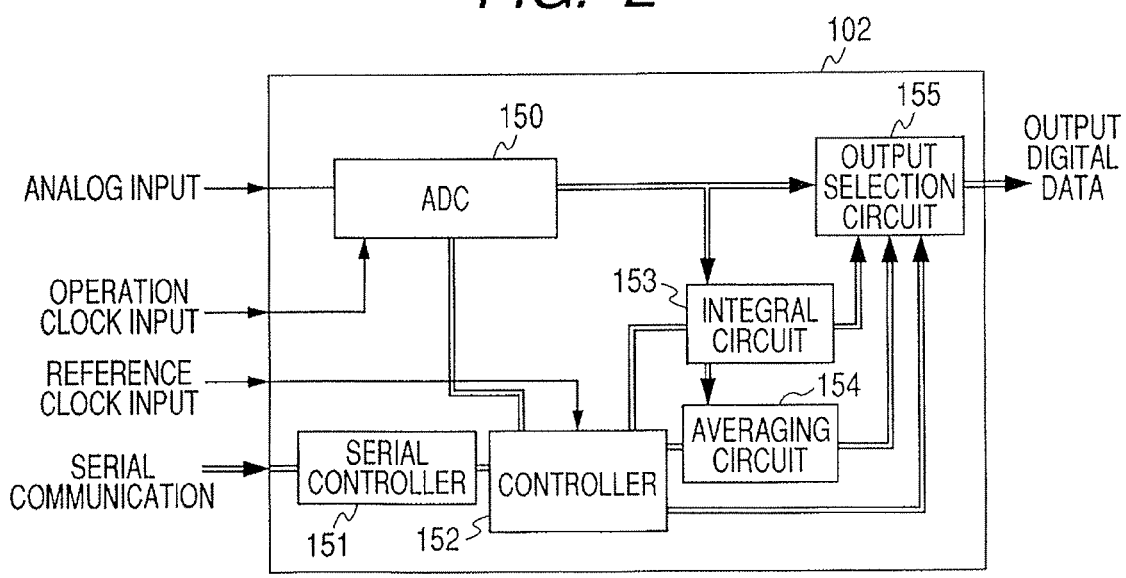
FIG. 2 is a configuration example of an A/D converter.

The internal structures of the A/D converters 102 and 103 are the same as in the description of the first exemplary embodiment in FIG. 2. FIG. 6 has been described above.

Figure 7:
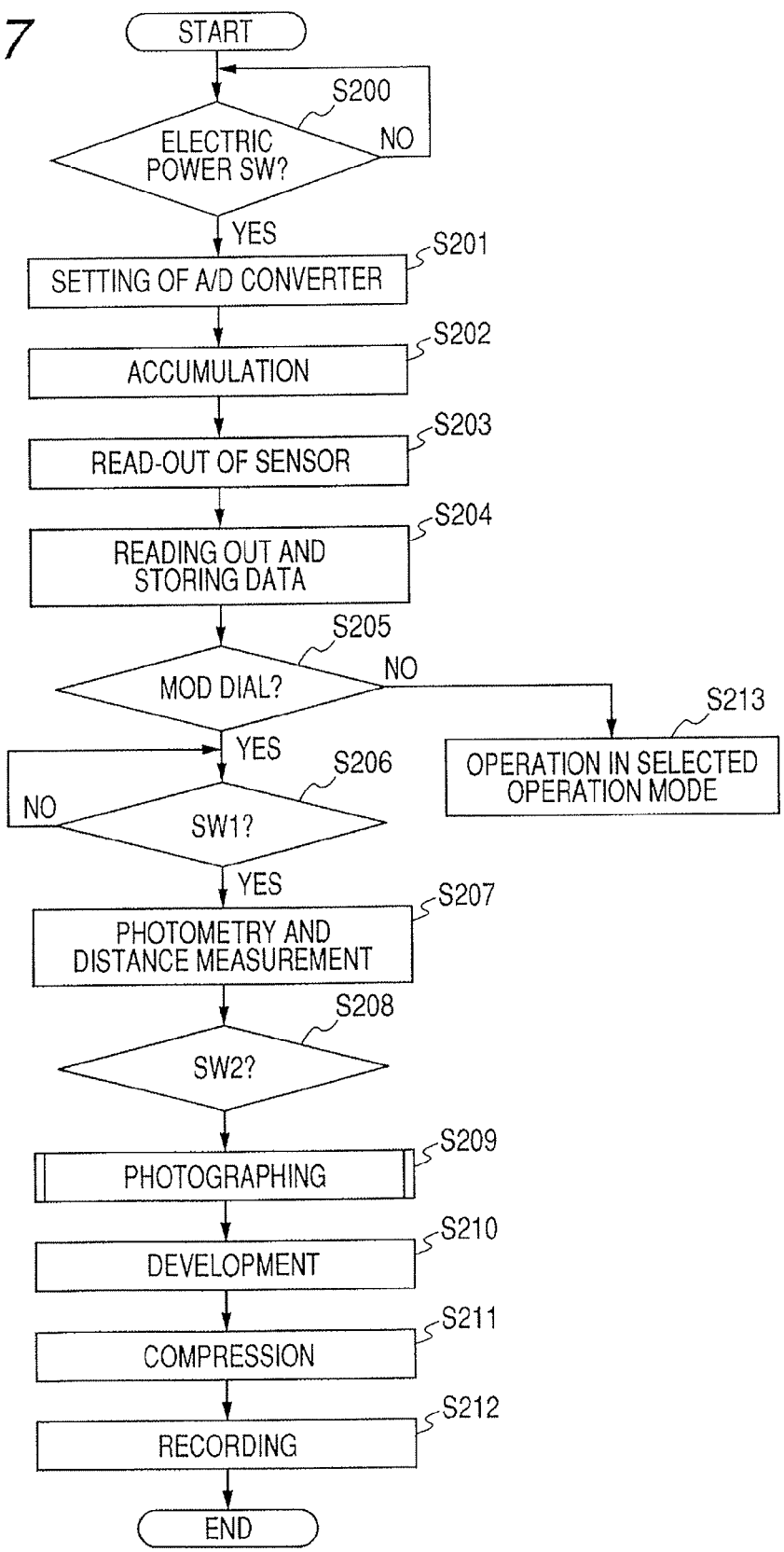
FIG. 7 is a flowchart which shows control of a camera according to the second exemplary embodiment.

Then, operations in the camera system illustrated in FIG. 6 will be described with reference to a flowchart of FIG. 7.

In a CMOS image sensor 101 having a plurality of output channels, there may be an offset difference between output levels of the plurality of channels due to a difference in manufacturing.

When such an inter-channel offset difference exists, vertical stripe noise may be seen over a screen and particularly in a low luminance portion, or the color balance of an image may be destroyed.

Particularly when the CMOS has a great number of channels, there is a problem that vertical stripe noise becomes very visible because G outputs (luminance signals) of the channels vary.

Therefore, in the embodiment, a method for calculating a clamp of an offset and an inter-channel offset amount contained in a dark image and correcting them at the same time will be described.

In step S200, whether the electric power switch 111 which activates the camera is on or not is determined, and, if it is off, step S200 is repeated. If the electric power switch 111 is on, an inter-channel offset detecting operation is performed from step S201.

In this case, a dark image is photographed in a predetermined accumulation time without operating a mirror and a shutter, and an inter-channel offset amount contained in the dark image is calculated.

Figure 8:
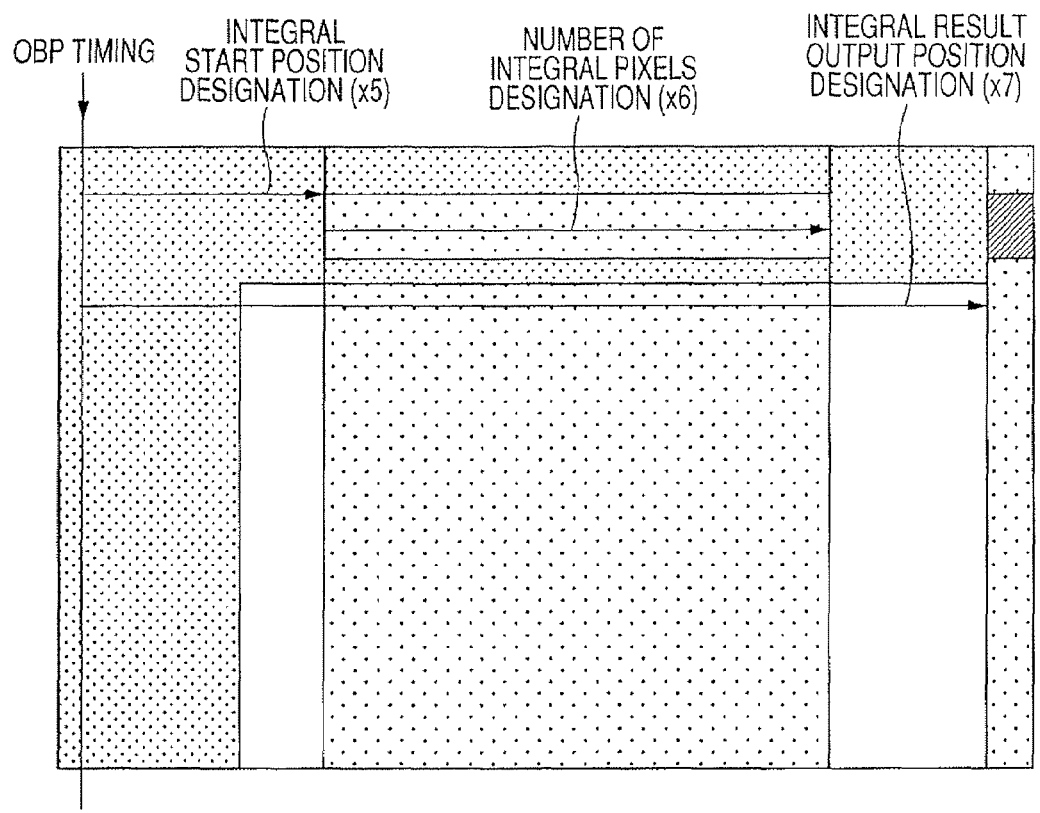
FIG. 8 is a diagram which shows a processing for calculating an average value of a vertical OB portion.

For photographing, in the step 201, the CPU 107 sets the A/D converters 102 and 103 as follows. (1) an average value calculation mode is set, (2) an integral start position (x5) is set, (3) the number of integral pixels (x6) is set, and (4) an average data output position (x7) is set in positions shown in FIG. 8, and a vertical OB area on the upper side of the image pickup element is integrated for each channel to calculate each average value. And, on the right side of the vertical OB portion, an average value is set as a normal output to be outputted. Preferably, the same value is set to the A/D converters 102 and 103 here. The vertical OB area is a pixel area optically shielded from light on the upper side of the image pickup element 101.

A reference signal (OBP timing), which is a reference for setting each position, is supplied from the timing generation circuit 106 to the A/D converters 102 and 103. Each setting value is set as the number of operation clock signals which are supplied to the A/D converters 102 and 103 from the reference signal until a desired operation is started. The A/D converters 102 and 103 count the numbers of operation clock signals from timings of the reference signals, and respective operations are performed when the numbers reach the setting values, respectively. Of course, additional basic settings for the A/D converter are also set.

In these settings, the accumulation of the CMOS image sensor 101 is started in the step S202. A dark image will be made since the shutter is not open at this time point. A short accumulation time within which a dark current has no affect is enough accumulation time here. After a predetermined accumulation time, a readout operation of the CMOS image sensor 101 is started in step S203.

Because the CMOS image sensor 101 outputs an analog output in response to a signal from the timing generation circuit 106, the A/D converter 102 also performs an A/D conversion operation at this timing and sends a result of the operation to the DSP 105. In this operation mode, the DSP 105 performs no correction processing particularly, and develops image data in the RAM 109.

Then, in step S204, a readout and storage operation of inter-channel offset correction data is performed.

In this step, data having an address at which the average value data calculated by the A/D converters 102 and 103 is written is read out from the image data previously read out and developed in the RAM 109 and stored.

Figure 9:
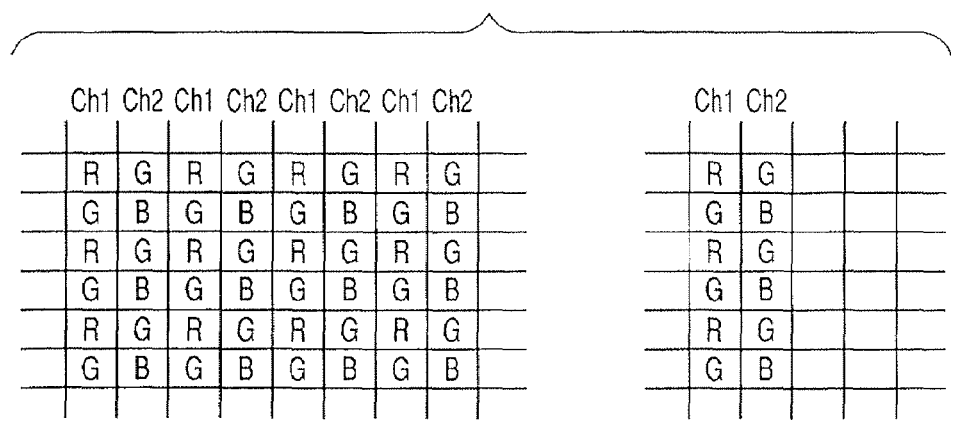
FIG. 9 is a diagram which shows an output for each channel.

In FIG. 9, an output for each channel is illustrated in a detailed conceptual diagram. Although the A/D converter performs an integral operation actually in an OB portion so that there is no color information such as R, G and B, R, G, and B are shown for the sake of easy representation.

Thus, an integral area is an area which starts from Ch1 and ends at Ch2, and also an average value calculation result is written as image data in order from Ch1 to Ch2.

In the present step, a predetermined address is read out from the image data which is output data of each channel of each row within an integral area in the vertical OB portion developed in the RAM 109, to read out a necessary number of data.

Vertical selection of an area in an image is set depending on from where to where firmware performs processing.

Since a position in which average value data in image data is written can be easily calculated from a value set in the timing signal generation circuit 106, average value data of each row in vertical direction can be sequentially read out by sequentially reading out a corresponding address on the RAM 109.

Since an average value described in each row is an average value of each row, an average value within an integral area for each channel can be calculated by calculating an average value of all rows data for each channel in DSP 105.

In addition, if the ROM 108 is writable, this data may be written into not only the RAM 109 but also the ROM 108. Further, in the present step, the previously read out image data is cleared.

In this way, the inter-channel offset correction data is calculated and written into the predetermined register in the DSP 105, and then the process proceeds to the following step S205. In a normal photographing operation, offset correction data for each channel stored in a relevant register of the DSP 105 is subtracted from respective corresponding channel outputs of data read out from the CMOS image sensor 101 when being processed by the DSP 105. At the time when each correction data is subtracted, an offset originally held by the CMOS image sensor 101 and an inter-channel offset difference are corrected.

In step S205, whether the mode dial 114 is set in a photographing mode or not is determined. If it is set in the photographing mode, then the process proceeds to step S206. If it is set in another mode, an operation in the selected operation mode is performed in step S213.

In step S206, whether the shutter switch (SW1) 112 is on or not is determined. If the shutter switch 112 is off, the processing of step S206 is repeated. If the shutter switch 112 is on, the process proceeds to step S207.

In step S207, a photometry processing operation, which determines an aperture value and a shutter speed, and a distance measurement processing, which adjusts a focus of a taking lens on an object, are performed using a photometry control section and a distance measurement control section (not shown).

After the photometry processing and distance measurement processing are completed, the status of the shutter switch (SW2) 113 is determined in the next step S208. If the shutter switch 113 is off, step S208 is repeated. If it is on, the photographing processing operation of step S209 is performed. Inter-channel offset correction is also performed in this photographing processing operation, and details of the correction will be described later.

In step S210, DSP 105 performs development processing on the photographed image data. Then, in the step S211, the developed image data is compressed and then stored in a space area of the RAM 109.

In step S212, the image data stored in the RAM 109 is read out and recorded on the recording medium 110. Then, the operation for single photographing is completed and ready for a next sequence.

An advantage will be described here. It is advantageous that the processing time of readout of image data is shorter than that of readout of a calculation result though a serial communication. In a serial communication, there is overhead until communication procedure is executed, and this requires further communication time. On the other hand, since image data is transferred to the RAM 109 while being read out from the image pickup element and read simply by reading out the data of a predetermined address, there is an advantage that data can be obtained at a significantly high speed.

Since an average output of the Ch1 and an average output of the Ch2 of the vertical OB portion can be calculated as described above, correction data (a target dark level−an average value of each channel) is calculated based on the average output results and written into a predetermined register of the DSP 105. After this, the process returns to the main processing.

Figure 10:
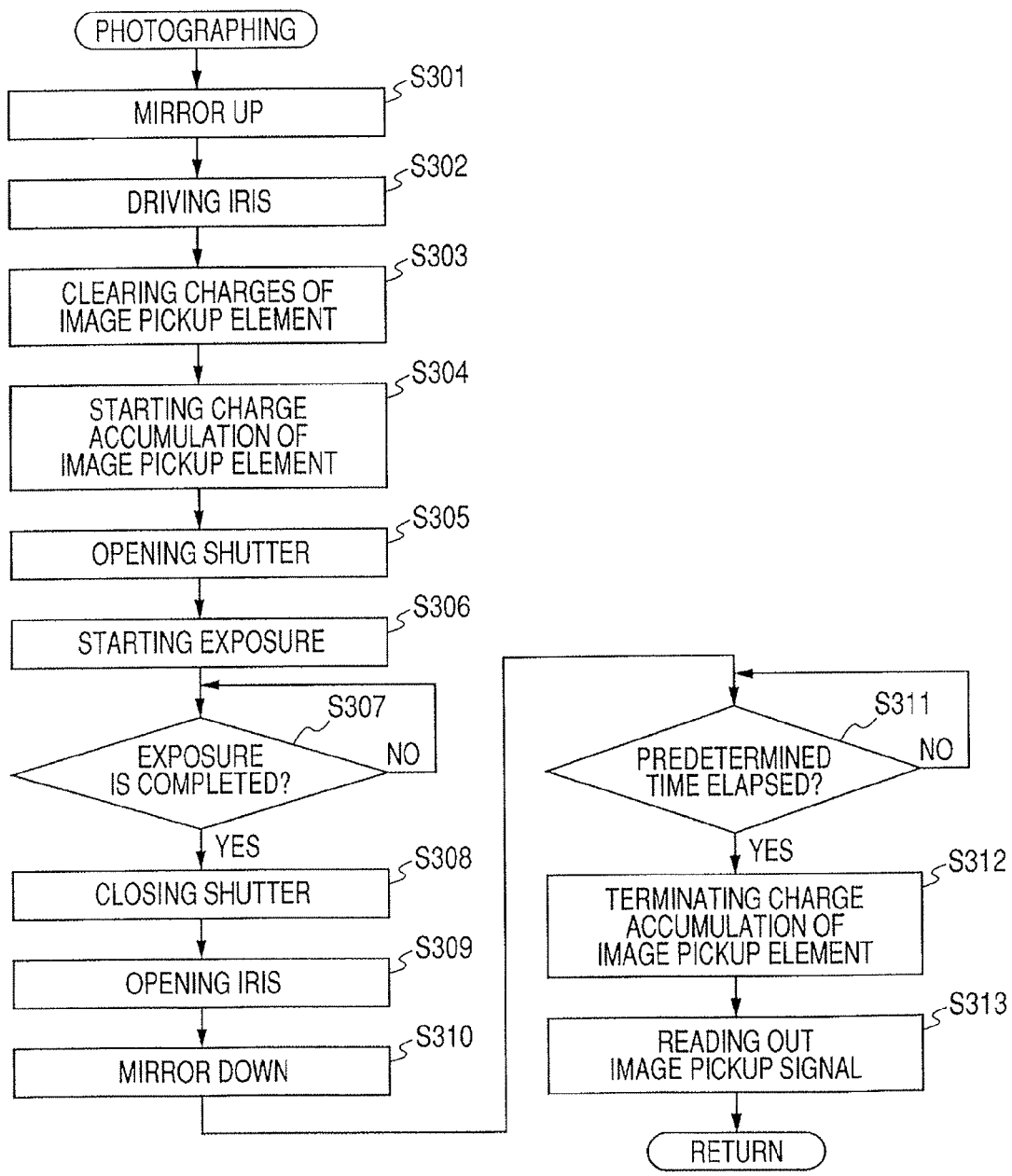
FIG. 10 is a flowchart which shows details of a photographing processing operation.

Details of the photographing processing of step S209 will now be described with reference to FIG. 10. At first, in step S301, the mirror is moved to a mirror-up position. In step S302, an iris is driven so as to attain a predetermined aperture value based on photometry data obtained by the above described photometry processing (step S207).

Charges of the image pickup element 101 are cleared in step S303, and charge accumulation is started in step S304. After the start of charge accumulation, the shutter is opened in step S305, and exposure of the image pickup element 101 is started in step S306.

Since then, the process waits until the end of exposure according to the photometry data in step S307, and then the shutter is closed in the step S308.

The iris is driven so as to attain an aperture value of open in step S309, and the mirror is driven to a mirror-down position in step S310.

The process waits until a predetermined charge accumulation time has elapsed in step S311, and then the charge accumulation of the image pickup element 101 is completed (step S312).

At the last, in the step S313, a signal of the image pickup element 101 is read out. At this time, inter-channel offset correction data has already been stored in the register included in the DSP 105 as described above, and therefore the following processing is performed after correction data is subtracted from readout data for each channel. Consequently, all inter-channel offsets become corrected high-quality image data. This sequence of processing is thus completed and the process returns to the main processing.

Third Exemplary Embodiment

A configuration of a camera according to the third exemplary embodiment of the present invention is the same as shown in the second exemplary embodiment and a description thereof is omitted here. In the embodiment, an output gain is adjusted and integral for each color is performed.

Figure 11:
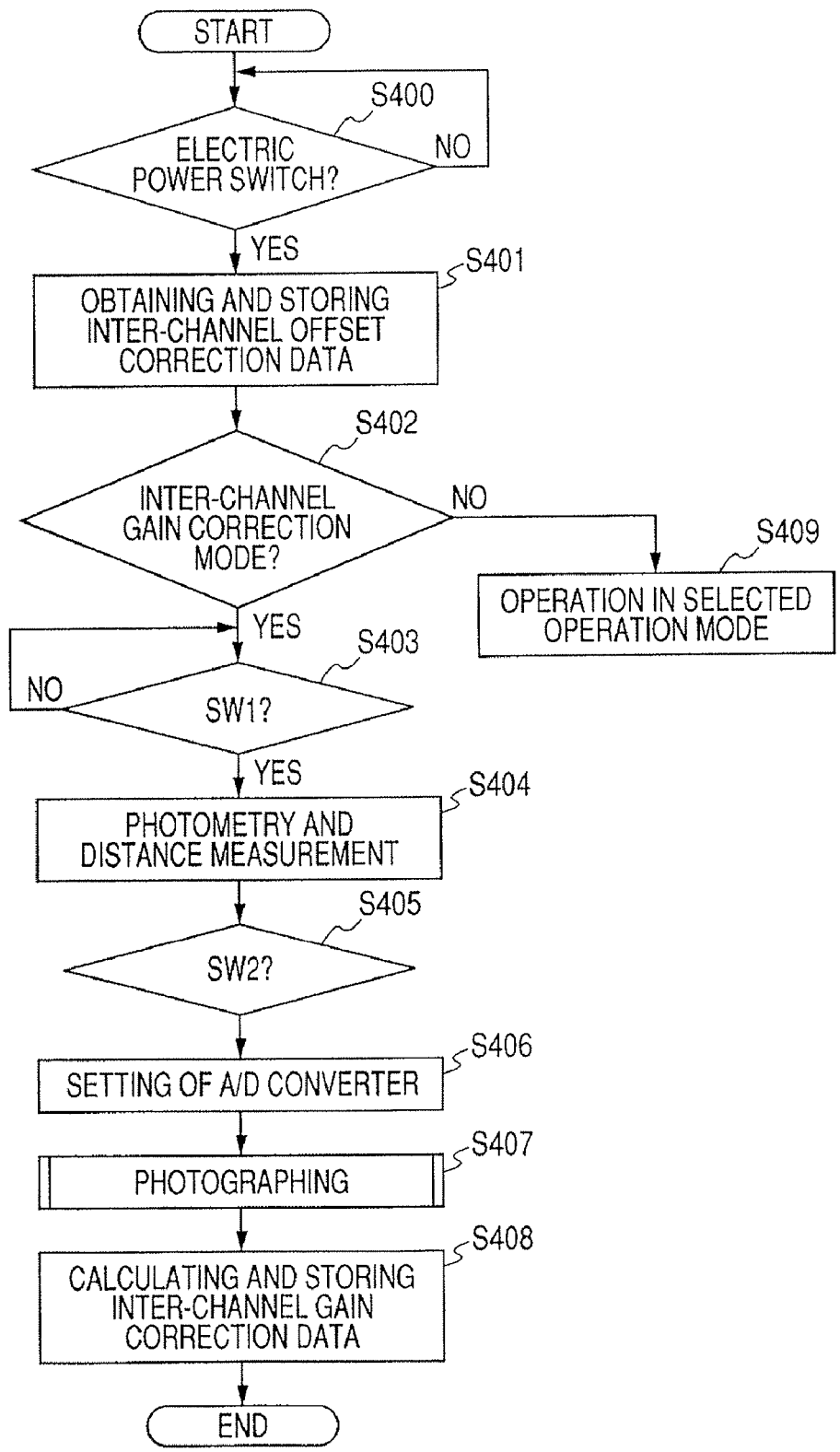
FIG. 11 is a flowchart which shows control of a camera according to the third exemplary embodiment.

A specific operation of the embodiment will be described with reference to FIG. 11. In a CMOS image sensor 101 having a plurality of output channels, there may be a gain difference between output levels of the channels due to a difference between the channels in manufacturing. When such an inter-channel gain difference exists, a vertical stripe noise may be seen over a screen and particularly in a low luminance portion, or a color balance of an image may be destroyed. Particularly when the CMOS has a great number of channels, there is a problem that vertical stripe noise becomes very visible because G outputs (luminance signals) of the channels vary. Typically, to solve this problem, means for, in the manufacturing of cameras, calculating a gain difference between channels from an image obtained by photographing a uniform luminance surface and correcting the difference is provided in an adjustment process. In the embodiment, the use of the means for such an adjustment process will be described.

Operations in an inter-channel gain correction mode in the camera system illustrated in FIG. 6 will be described with reference to a flowchart of FIG. 11.

In step S400, whether the electric power switch 111 is on or not is determined, and, if it is off, step S400 is repeated. If the electric power switch 111 is on, the process proceeds to the next step S401.

In the step S401, a series of operations in which a dark image is photographed, inter-channel offset data is calculated, and the data is written into a predetermined register of the DSP 105 are performed as described in the second exemplary embodiment. This series of operations is the same as in the second exemplary embodiment.

In the following photographing of a uniform luminance surface, offset correction data for each channel stored in a relevant register of the DSP 105 is subtracted from respective corresponding channel outputs of data read out from the CMOS image sensor 101 when being processed by the DSP 105. At the time when each correction data is subtracted, an offset originally held by the CMOS image sensor 101 and an inter-channel offset difference are corrected.

In this way, inter-channel offset correction data is calculated and written into the predetermined register in the DSP 105, and then the process proceeds to the following step S402.

In step S402, whether the inter-channel gain correction mode has been set or not is determined. If the mode has been set, then the process proceeds to step S403. If another mode has been set, an operation in the selected operation mode is performed in step S409.

In step S403, whether the shutter switch (SW1) 112 is on or not is determined. If the shutter switch 112 is off, the processing of step S403 is repeated. If the shutter switch 112 is on, the process proceeds to step S404.

In step S404, a photometry processing operation, which determines an aperture value and a shutter speed, and a distance measurement processing, which adjusts a focus of a taking lens on an object, are performed using a photometry control unit and a distance measurement control unit (not shown).

In this case, as a part of the adjustment process, an aperture value, a shutter speed and the like are manually set to a predetermined optimum value.

After the photometry processing and the distance measurement processing are completed, a status of the shutter switch (SW2) 113 is determined in the next step S405. If the shutter switch 113 is off, step S405 is repeated. If it is on, the process proceeds to the step S406.

In the step S406, the CPU 107 communicates with the A/D converters 102 and 103. Then, (1) an average value calculation mode is set, (2) an integral start position (x11) is set, (3) the number of integral pixels (x12) is set, and (4) an average data output position (x13) is set in positions shown in FIG. 12, and the vicinity of a center of an opening of the image pickup element 101 is set to be able to be integrated. Actually, since operations performed in the vertical direction are the same operation, settings only in the horizontal direction are set. In addition, a calculation result of an average value is also set as a normal output and to be outputted as an average value output in a leftmost area of the image. Therefore, at the leftmost part of the captured image, an average value of each respective column of Ch1 and Ch2 is outputted.

Figures 12, 13:
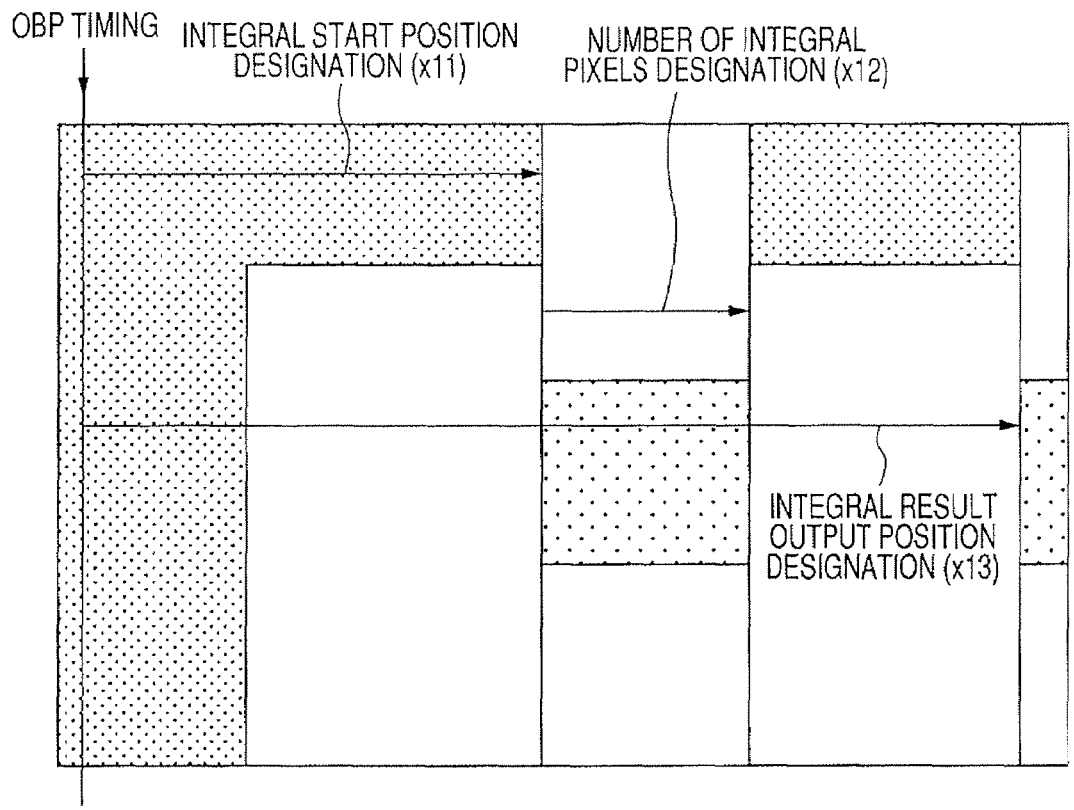
FIG. 12 is a diagram which shows a processing for calculating an average value of a central portion.
FIG. 13 is a diagram which shows an output for each channel.

Since light signals are detected here, in Ch1, an R output and a G output occur on each row. And, in Ch2, a G output and a B output occur on alternate rows respectively. This appearance is shown in FIG. 13.

Then, in step S407, a photographing operation is performed. In this case, although the photographing operation will be described in detail later, a uniform light source is photographed so that an output of a target area is as uniform as possible. Since the photographing operation is the same as the sequence in the second exemplary embodiment, a description of the operation is omitted.

Since an average value of each channel of each row is stored in a predetermined area of a thus obtained image pickup signal, in step S408, average values of, for example, only G outputs of each channel from among these output values are calculated for a predetermined range of rows by the DSP. As a result, an average value of G outputs for each channel in the predetermined area is calculated.

Further, an average value of all channels is calculated, a ratio of the average value of all channels to an average value of each channel is calculated, and correction data is calculated so as to equalize outputs of all channels, thereby obtaining a correction value of a gain for each channel.

In other words, a gain correction value is written into a predetermined register of the DSP 105 for each channel during normal photographing, and thereby calculation that is a multiplication by the gain correction data for each channel is performed during a readout operation. Thus, with this multiplication for each channel, high-quality image data whose inter-channel gain difference is corrected can be obtained.

High-quality image data whose inter-channel gain difference is corrected can be obtained during normal photographing by storing an inter-channel gain correction value obtained in the above described adjustment process in the ROM 108, and transferring the correction value to the predetermined register of the DSP 105 in each normal photographing mode. Thus, the operations in the adjustment mode are completed.

Although digital correction values are calculated from a image captured during one-time photographing and completed in the embodiment, an average value may be further calculated from correction data obtained during photographing at multiple times, obtained by photographing uniform luminance surfaces multiple times. In addition, in a camera system having means which multiplies the gain of each channel using an analog method instead of a DSP, the obtained gain correction data may be converted to an analog correction value by which the gain is multiplied.

In the embodiment, an average value of each channel of each row is calculated, and the calculated value is outputted as image data. However, in the case where an average value of a plurality of rows is further calculated, more accurate calculation is allowed by calculating an integral value for each row and calculating an average value using a total sum of integral values of a plurality of rows, than by calculating an average value for each row. In this case, an integral value of each channel of each row can be outputted by setting an "integral value calculation mode" in an A/D converter. In this case, at a timing for outputting, such output is outputted as two pixel data per channel. For example, when the A/D converter has a 16-bit output, up to 32-bit length data of integral results can be outputted using a two-pixel area. Of course, an inside integral circuit is not required to have a 32-bit length. This appearance is shown in FIG. 13. In FIG. 13, an additional character U represents the upper 16 bits of integral results and an additional character L represents the lower 16 bits thereof.

As described above, in the first, second and third embodiments, by mounting an integral circuit and an averaging circuit on an A/D converter itself, an optimum circuit configuration is realized only by providing the A/D converter supporting the number of channels of a CMOS image sensor without mounting extra hardware on an image processing circuit side.

When a vertical shading is calculated, only a calculation result of the A/D converter is needed to be readout, and therefore the image processing circuit side is not burdened.

Even when an average value within a predetermined area is calculated, the amount of calculation to be processed by firmware is significantly reduced so that the time for arithmetic processing can be significantly reduced.

In addition, by outputting calculation data such as an integral value and an average value as an output of the A/D converter itself, the data can be sent and received in a format with which the image processing circuit side can directly read out the data. For example, the communication time can be significantly reduced compared to sending and receiving of data through a serial communication or the like.

In the embodiments, a calculation operation of the A/C converter is reset at each row as described above. However, in a configuration where a reset operation is configured to be performed only at a first row instead of at each row in certain settings, integral calculation and average value calculation are also realized only by hardware without firmware. Such modifications may be suitably changed within the sprit and scope of the present invention.

The present embodiment includes an A/D converter used in an image capture apparatus and detects a reference signal supplied to the A/D converter. At a timing designated by calculation start position information, the number of calculation data, calculation designation information and calculation result output position information that are set by the reference signal, a calculation result is outputted instead of original output data which is an inputted analog signal converted to digital data.

When an average value of an optical black portion that is a black reference for an image pickup element is calculated, a dark image is photographed with an image pickup element shielded from light. In the case where a mapping operation is performed on the image in the horizontal direction and vertical dark shading correction data is calculated, dedicated large hardware is not needed even when an average value is further calculated for each RGB output of a specific area of an opening. Additionally, firmware of a control CPU needs not repeat time-consuming operations and the operations can be easily processed.

Particularly, in an image capture apparatus using a multi-channel CMOS image sensor which has a plurality of readout channels and reads out a plurality of pixels simultaneously, large hardware for processing the plurality of channels separately is not needed even when a calculation for each channel and for each color is performed. Additionally, the need to perform operations by firmware which requires a processing time for repeating a process for each channel is reduced, and there are technological advantages that the burden on the system is significantly reduced and the costs of the entire system are significantly reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-373090, filed Dec. 26, 2005, which is hereby incorporated by reference herein in its entirety.

What is claimed is:

1. An image capture apparatus, comprising:
an image pickup element that generates an analog signal;
an A/D conversion unit that converts the analog signal generated by said image pickup element to a digital signal;
an operation unit that performs a predetermined operation on a plurality of digital signals converted by said A/D conversion unit from the analog signals output from a plurality of optical black pixels of said image pickup element;
a selection unit that selects and outputs one of the digital signals converted by said A/D conversion unit and a result of the predetermined operation by said operation unit;
a setting unit that sets an output start timing of the result of the predetermined operation by said operation unit, in a case where the digital signals converted by said A/D conversion unit from the analog signals which are read out from said image pickup element to generate dark correction data are output; and
a control unit that controls said selection unit such that the digital signals converted by said A/D conversion unit from the analog signals read out from a plurality of pixels of said image pickup element are output by said selection unit before the output start timing set by said setting unit is reached, and the result of the predetermined operation performed on the output digital signals by said operation unit is output by said selection unit when the output start timing set by said setting unit is reached.

2. The signal processor according to claim 1, wherein said operation unit calculates an average value of said plurality of digital signals.

3. The signal processor according to claim 1, wherein said operation unit calculates an integral value of said plurality of digital signals.

4. The image capture apparatus according to claim 1, wherein
said image pickup element includes the plurality of pixels in the horizontal direction and in the vertical direction, and
said operation unit calculates an average value of digital signals from the plurality of optical black pixels sequentially for each of a plurality of lines within the image pickup element.

5. The image capture apparatus according to claim 1, wherein
said image pickup element includes the plurality of pixels in the horizontal direction and in the vertical direction, and
said operation unit calculates an integral value of digital signals from the plurality of optical black pixels for each of a plurality of lines within the image pickup element.

6. The image capture apparatus according to claim 1, wherein said selection unit performs the selection process based on an external signal.

7. The image capture apparatus according to claim 1, wherein the plurality of optical black pixels are arranged outside an effective pixel area of said image pickup element.

* * * * *